United States Patent
Morioka et al.

(10) Patent No.: US 6,526,010 B1
(45) Date of Patent: Feb. 25, 2003

(54) RECORDING MEDIUM, METHOD AND APPARATUS FOR RECORDING/REPRODUCING INFORMATION WHICH HAS BEEN SCRAMBLED USING A MEDIUM IDENTIFIER AND A SECTOR NUMBER

(75) Inventors: Koichi Morioka, Katano (JP); Takashi Yumiba, Uji (JP); Teruyuki Takizawa, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 68 days.

(21) Appl. No.: 09/686,967

(22) Filed: Oct. 12, 2000

(30) Foreign Application Priority Data

Oct. 13, 1999 (JP) .......................................... 11-290665

(51) Int. Cl.⁷ ............................................... G11B 5/09
(52) U.S. Cl. .................................. 369/47.15; 369/53.21
(58) Field of Search .......................... 369/47.12, 47.13, 369/47.15, 53.2, 53.21, 53.31, 59.1, 59.26, 124.07, 59.23, 59.24, 59.25, 275.3

(56) References Cited

U.S. PATENT DOCUMENTS 5,596,639 A   1/1997   Kikinis

FOREIGN PATENT DOCUMENTS

| EP | 0 756 279 | 1/1997 |
| EP | 0 802 527 | 10/1997 |
| EP | 0 802 535 | 10/1997 |
| WO | 97/14147  | 4/1997 |

OTHER PUBLICATIONS

Natsume Matsuzaki et al. "DVD Content Scramble System" ITE Technical Report vol. 21, No. 31, pp 15–19, May 1997.
Database WPI, Derwent Publications Ltd., London, GB; AN 1997–390880, XP002158649; Ishiguro R; Minami M, "Encipherment and decoding method–by using different encryption keys and decryption keys for various inherent information e.g. video signal, audio signal, data signal" & JP 09 171619 A (Sony Corp), Jun. 30, 1997 *abstract*.

*Primary Examiner*—Paul W. Huber
(74) *Attorney, Agent, or Firm*—Wenderoth, Lind & Ponack, L.L.P.

(57) ABSTRACT

An information recording medium includes a plurality of sectors each of which has a sector header area storing a unique sector number and a data storage area for storing user data. User data to be recorded onto the information recording medium is scrambled using a data scramble key generated from a unique medium identifier of the information recording medium and a sector number of a sector into which the user data is to be recorded. The medium identifier used here has been scrambled using a medium identifier scramble key generated from predetermined data and a sector number of a sector into which the medium identifier is to be stored, and stored in that sector. In so doing, security is ensured not only for each individual information recording medium but also for each individual sector, with it being possible to protect data recorded on the information recording medium against unauthorized reproduction.

20 Claims, 13 Drawing Sheets

RECORDING MEDIUM, METHOD AND APPARATUS FOR RECORDING/REPRODUCING INFORMATION WHICH HAS BEEN SCRAMBLED USING A MEDIUM IDENTIFIER AND A SECTOR NUMBER

This application is based on an application No. H11-290665 filed in Japan, the content of which is hereby incorporated by reference.

BACKGROUND OF THE INVENTION

1. Field of the Invention

The present invention relates to an information recording medium including a plurality of sectors that are each made up of a sector header area and a data storage area, and a method and apparatus for recording and reproducing data using the information recording medium. In particular, the invention relates to an information recording medium, information recording/reproducing apparatus, and information recording/reproducing method for recording and reproducing data that is scrambled using a scramble key generated based on a sector number and a medium identifier of the information recording medium.

2. Prior Art

To protect data recorded on an information recording medium against unauthorized reproduction, techniques have been developed whereby data is scrambled or encrypted before being recorded onto an information recording medium. An unauthorized party cannot descramble or decrypt such scrambled or encrypted data properly and thus cannot reproduce the data in intelligible form.

One of the techniques for encrypting data to be recorded is disclosed in Japanese Laid-Open Patent Application No. H07-249264. According to this encryption system, after data is encrypted with an encryption key, the encrypted data and the encryption key are recorded in different sectors of a CD-ROM. Upon receiving a request to read the encryption key from the user via a personal computer, a reproducing apparatus reads the encryption key from the CD-ROM, decrypts the encrypted data using the read encryption key, and reproduces the decrypted data. The advantage of this system is that it facilitates the changing of the encryption key.

Also, one of the techniques for scrambling data to be recorded is presented by the standard developed for the physical format of DVDs.

In the aforementioned encryption system, however, the encryption key is recorded on the CD-ROM together with the encrypted data, so that an unauthorized party can easily read the encryption key and the encrypted data from the CD-ROM through the use of a device capable of reading CD-ROMs such as a general personal computer, and decrypt the encrypted data with the encryption key. Thus, the secrecy of the encryption key is not fully ensured in this system. Besides, one of the sectors of the CD-ROM is intended to store only the encryption key and cannot be used for storing data. This decreases the recording efficiency of the information recording medium.

Also, the scrambling defined by the DVD physical format standard is aimed at suppressing crosstalk between adjacent tracks, rather than protecting copyright. Which is to say, data scrambled and recorded under the DVD physical format standard can be reproduced by any reproducing apparatus that complies with this standard. Thus, this method also fails to prevent unauthorized data reproduction.

SUMMARY OF THE INVENTION

The present invention aims to provide an information recording/reproducing apparatus and method which encrypt or scramble data so that the data cannot be recovered by unauthorized means, and an information recording medium used by such apparatus and method.

The above object can be fulfilled by an information recording medium including: a first sector which has a unique sector number and stores a medium identifier unique to the information recording medium; and a plurality of second sectors each of which has a unique sector number and stores user data, wherein the user data stored in each of the plurality of second sectors has been scrambled using a data scramble key generated based on the medium identifier and the sector number of the second sector.

With this construction, user data is scrambled with a data scramble key that differs not only for each information recording medium but also for each sector. This makes it difficult for unauthorized users to reproduce data.

Here, the data scramble key may be a sequence of random numbers generated from an initial value determined based on the medium identifier and the sector number of the second sector, wherein the user data has been scrambled by performing a predetermined operation on the user data and the sequence of random numbers on a byte-by-byte basis.

With this construction, each byte of the user data to be recorded is scrambled with a different random number out of the random numbers that constitute the data scramble key, so that security against unauthorized data reproduction is further strengthened.

Here, the medium identifier stored in the first sector may have been scrambled using a medium identifier scramble key generated based on predetermined data and the sector number of the first sector.

With this construction, the medium identifier that is used for generating the data scramble key is scrambled and stored on the information recording medium. This prevents unauthorized users from acquiring the medium identifier, so that security against unauthorized data reproduction is further strengthened.

Here, the first sector may also store user data.

With this construction, it is possible to make effective use of the data storage area of the sector that stores the medium identifier.

Here, the predetermined data may be stored in a lead-in area of the information recording medium.

With this construction, only authorized users who have access to the predetermined data can acquire the medium identifier and descramble the scrambled user data using the medium identifier, so that security against unauthorized data reproduction is further strengthened.

The above object can also be fulfilled by an information recording apparatus for scrambling user data and recording the scrambled user data onto an information recording medium, the information recording medium including a first sector which stores a medium identifier unique to the information recording medium and a plurality of second sectors each of which has a unique sector number and is used for storing user data, the information recording apparatus including: an initial value determining unit for determining an initial value based on the medium identifier and a sector number of a second sector into which the user data is to be recorded; a random number generating unit for generating a sequence of random numbers from the initial value; a scrambling unit for scrambling the user data using the sequence of random numbers; and a recording unit for recording the scrambled user data into the second sector.

With this construction, user data is scrambled with a scramble key that differs not only for each information recording medium but also for each sector. This makes it difficult for unauthorized users to reproduce data.

Here, the user data may be accompanied by type information showing a data type of the user data, wherein the initial value determining unit includes: a plurality of different initial value tables corresponding to different data types; and a table selecting unit for selecting one of the plurality of initial value tables in accordance with the type information accompanying the user data, and wherein the searching unit searches the selected initial value table for the candidate initial value associated with the generated reference data.

With this construction, the initial value can be varied depending on the type of the user data, which provides security for each individual user data type. For example, if user data is an application, then security is ensured for each of a plurality of applications recorded on the same information recording medium.

The above object can also be fulfilled by an information recording method for scrambling user data and recording the scrambled user data onto an information recording medium, the information recording medium including a first sector which stores a medium identifier unique to the information recording medium and a plurality of second sectors each of which has a unique sector number and is used for storing user data, the information recording method including: an initial value determining step for determining an initial value based on the medium identifier and a sector number of a second sector into which the user data is to be recorded; a random number generating step for generating a sequence of random numbers from the initial value; a scrambling step for scrambling the user data using the sequence of random numbers; and a recording step for recording the scrambled user data into the second sector.

With this construction, user data is scrambled with a data scramble key that differs not only for each information recording medium but also for each sector. This makes it difficult for unauthorized users to reproduce data.

The above object can also be fulfilled by an information reproducing apparatus for reproducing user data recorded on an information recording medium, the information recording medium including a first sector which stores a medium identifier unique to the information recording medium and a plurality of second sectors each of which has a unique sector number and is used for storing user data in a scrambled form, the information reproducing apparatus including: an initial value determining unit for determining an initial value based on the medium identifier and a sector number of a second sector in which the user data to be reproduced is stored in a scrambled form; a random number generating unit for generating a sequence of random numbers from the initial value; and a reproducing unit for reading the scrambled user data from the second sector, descrambling the scrambled user data using the sequence of random numbers, and reproducing the descrambled user data.

With this construction, user data that has been scrambled with a data scramble key which differs not only for each information recording medium but also for each sector can be reproduced properly.

The above object can also be fulfilled by an information reproducing method for reproducing user data recorded on an information recording medium, the information recording medium including a first sector which stores a medium identifier unique to the information recording medium and a plurality of second sectors each of which has a unique sector number and is used for storing user data in a scrambled form, the information reproducing method including: an initial value determining step for determining an initial value based on the medium identifier and a sector number of a second sector in which the user data to be reproduced is stored in a scrambled form; a random number generating step for generating a sequence of random numbers from the initial value; and a reproducing step for reading the scrambled user data from the second sector, descrambling the scrambled user data using the sequence of random numbers, and reproducing the descrambled user data.

With this construction, user data that has been scrambled with a data scramble key which differs not only for each information recording medium but also for each sector can be reproduced properly.

The above objects can also be fulfilled by a medium identifier recording apparatus for recording a unique medium identifier onto an information recording medium that includes a first sector for storing the medium identifier, including: an initial value determining unit for determining an initial value based on predetermined data and a sector number uniquely given to the first sector; a random number generating unit for generating a sequence of random numbers from the initial value; a scrambling unit for scrambling the medium identifier using the sequence of random numbers; and a recording unit for recording the scrambled medium identifier into the first sector.

With this construction, the medium identifier used for the generation of the data scramble key is scrambled and stored in the information recording medium, with it being possible to provide a high level of security for data recorded on the information recording medium.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED EMBODIMENTS

The following is a description of an information recording medium and an information recording/reproducing apparatus according to embodiments of the present invention, with reference to the figures.

First Embodiment

Figure 1:
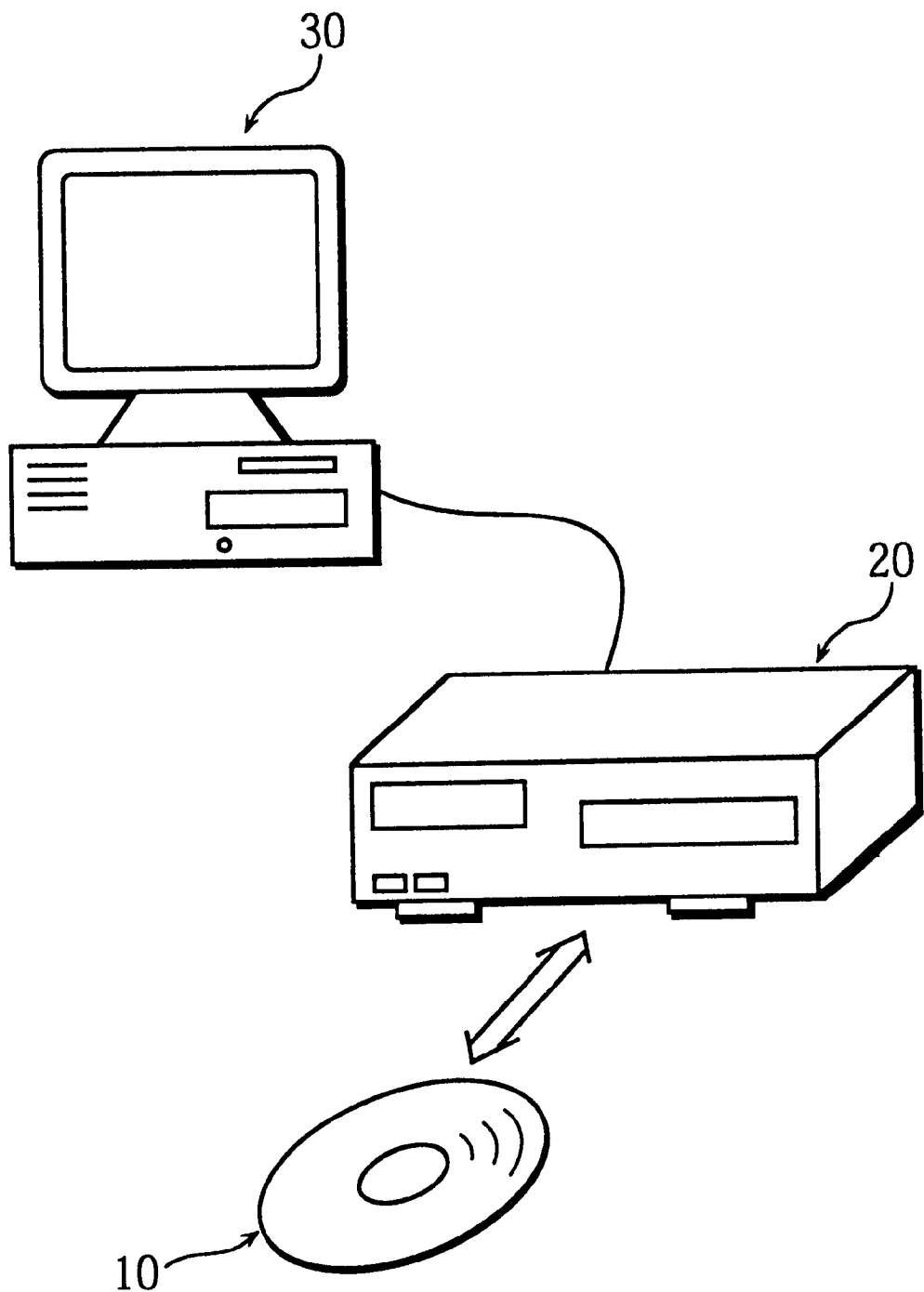
FIG. 1 shows the appearances and usage pattern of an information recording medium and an information recording/reproducing apparatus of the invention.

FIG. 1 shows the appearances and usage pattern of an information recording medium and an information recording/reproducing apparatus of the invention. In the figure, a personal computer (hereinafter, "PC") 30 is connected to the information recording/reproducing apparatus 20. The information recording/reproducing apparatus 20 records information acquired or created by the user using the PC 30 onto the information recording medium (optical disk) 10, or reproduces information recorded on the information recording medium 10 and presents it to the user through the PC 30. Here, the information recording/reproducing apparatus 20 performs scrambling of the information before recording it onto the information recording medium 10, and performs descrambling of the recorded information before reproducing it.

(Information Recording Medium 10)

Figure 2:
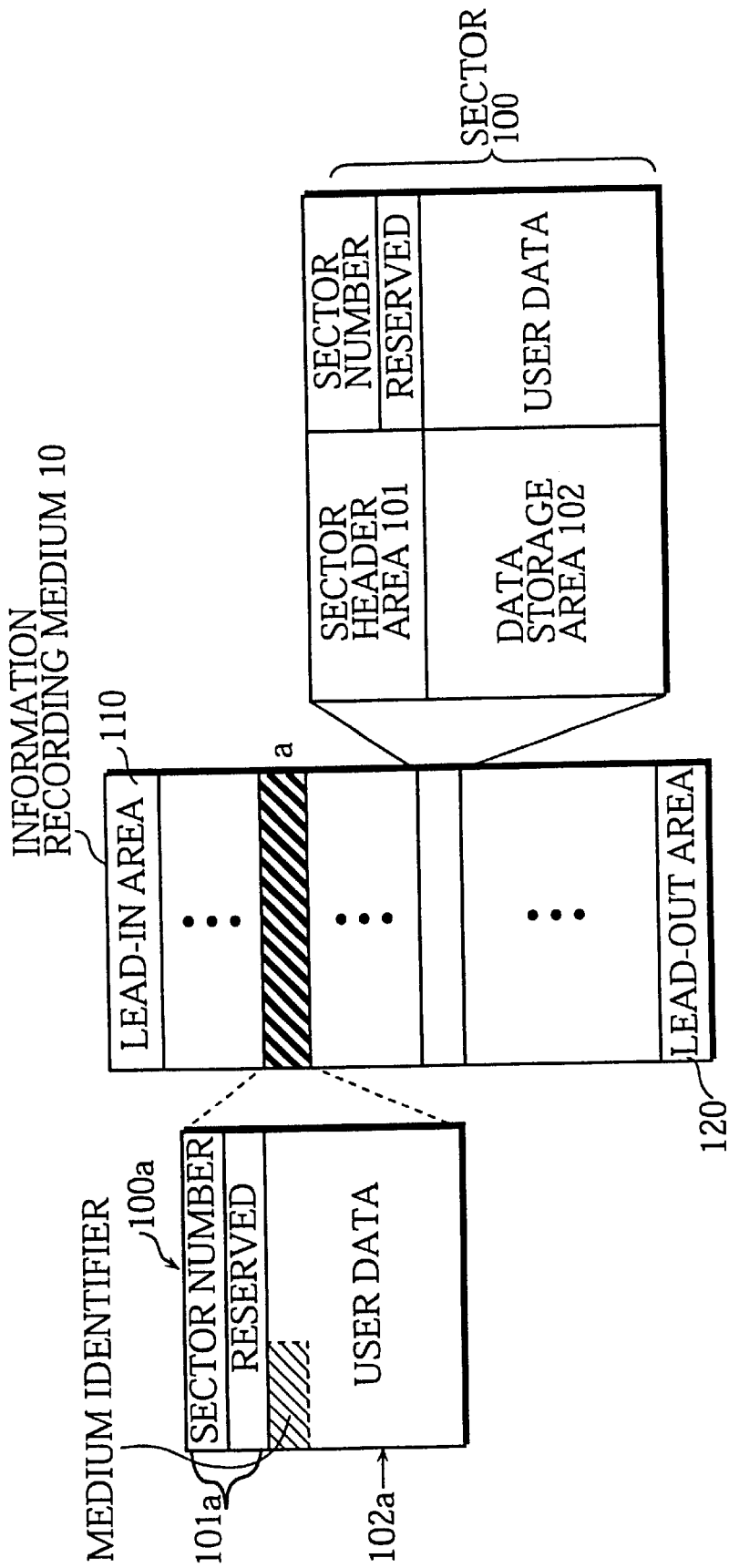
FIG. 2 shows the data structure of the information recording medium.

FIG. 2 shows the data structure of the information recording medium 10. In this information recording medium 10, a plurality of sectors 100 are arranged between a lead-in area 110 and a lead-out area 120. User data is scrambled and recorded in these sectors 100 by the information recording/reproducing apparatus 20.

Each of the sectors 100 is made up of a sector header area 101 and a data storage area 102, as shown in the figure. The sector header area 101 stores control information such as a sector number which has been uniquely given to the sector 100. The data storage area 102 is used for storing scrambled user data. The capacity of the data storage area 102 is 2048 bytes in this embodiment.

Also, a medium identifier is stored in a data storage area 102a of a sector 100a whose sector number is "a", among the plurality of sectors 100 in FIG. 2. The medium identifier is a number uniquely given to the information recording medium 10 at the time of manufacturing. Like the user data, the medium identifier is scrambled and stored into the data storage area 102a of the sector 100a (hereinafter, "medium identifier storage sector") by the information recording/reproducing apparatus 20. Since the size of the medium identifier is only 4 bytes (32 bits), storage space of the data storage area 102a which is not occupied by the medium identifier can be used for storing scrambled user data.

Here, the user data to be recorded on the information recording medium 10 and the medium identifier of the information recording medium 10 have the following relationship. As noted earlier, the user data is scrambled before being stored in one of the sectors 100. This scrambling of the user data employs a scramble key generated from the medium identifier and the sector number of the sector into which the user data is to be recorded. On the other hand, the scrambling of the medium identifier employs a scramble key generated from other information. The details of these scrambling processes will be explained with the information recording/reproducing apparatus 20 below.

(Information Recording/Reproducing Apparatus 20)

The information recording/reproducing apparatus 20 records information onto the information recording medium 10, or reads information from the information recording medium 10 and reproduces it, in accordance with a request from the user. Although the information recording/reproducing apparatus 20 includes construction elements, such as, for managing an interface with the user or the PC 30, for executing record operations, and for executing read and reproduce operations, the construction elements that constitute the features of the invention are: a data recording unit for scrambling the user data; a medium identifier recording unit for scrambling the medium identifier; a medium identifier reproducing unit for descrambling the scrambled medium identifier; and a data reproducing unit for descrambling the scrambled user data and reproducing the descrambled user data.

These four construction elements in the information recording/reproducing apparatus 20 are explained one by one below.

(Data Recording Unit)

Upon receiving the user data to be recorded on the information recording medium 10, the sector number of the sector into which the user data is to be recorded, and the medium identifier of the information recording medium 10, the data recording unit generates a scramble key based on the sector number and the medium identifier, scrambles the user data using the scramble key, and writes the scrambled user data into the appropriate sector of the information recording medium 10.

Figure 3:
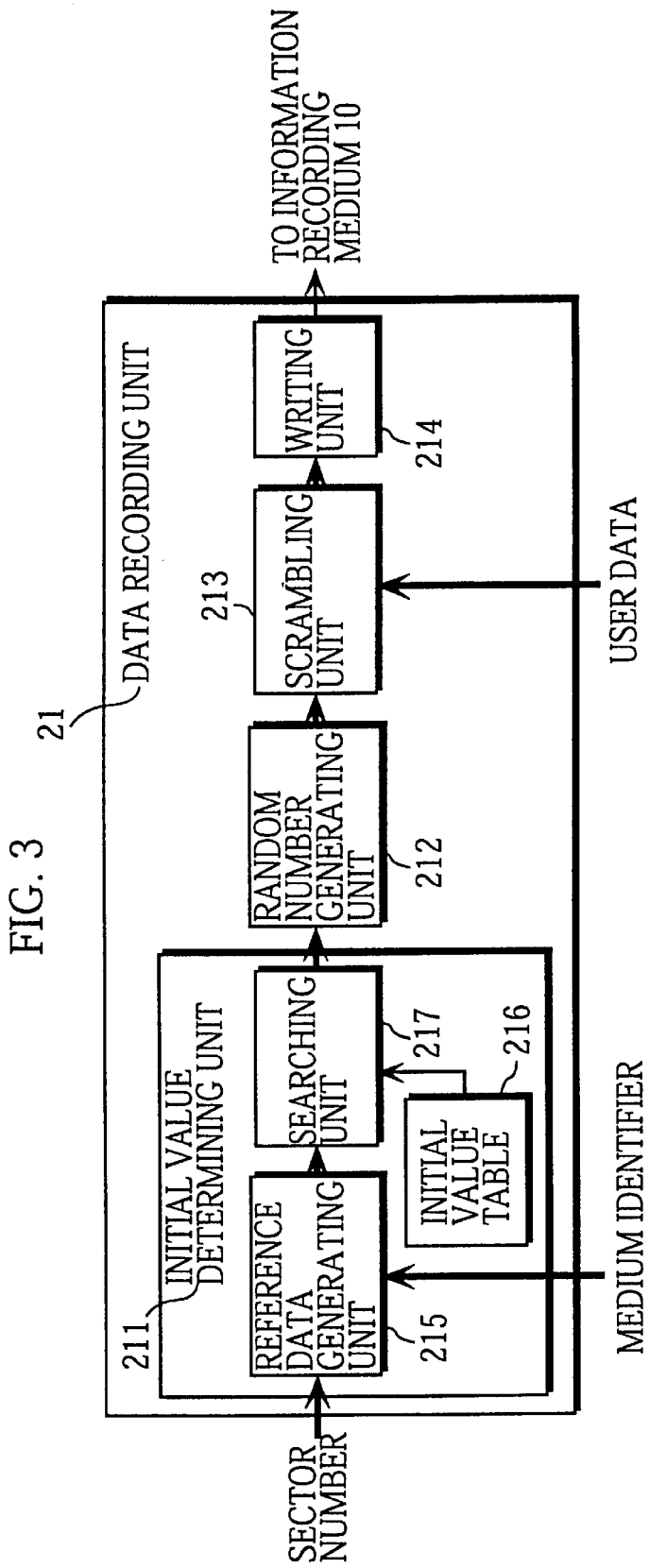
FIG. 3 is a block diagram showing the construction of a data recording unit in the information recording/reproducing apparatus according to the first embodiment of the invention.

FIG. 3 is a block diagram showing the construction of this data recording unit 21. In the figure, an initial value determining unit 211 determines an initial value for a sequence of random numbers used for scrambling the user data, based on the externally inputted sector number and medium identifier (such an initial value is hereinafter called "random number initial value"). A random number generating unit 212 generates the sequence of random numbers from the random number initial value, as the scramble key. A scrambling unit 213 scrambles the user data using the sequence of random numbers, on a byte-by-byte basis. A writing unit 214 writes the scrambled user data into the appropriate sector of the information recording medium 10.

Of these construction elements, the initial value determining unit 211 includes a reference data generating unit 215 for generating table reference data from the externally inputted sector number and medium identifier, an initial value table 216 holding a plurality of candidate random number initial values which are each associated with different table reference data, and a searching unit 217 for searching the initial value table 216 for a candidate random number initial value associated with the table reference data generated by the reference data generating unit 215. Here, the reference data generating unit 215 performs an XOR (exclusive-OR) operation for corresponding bits in the sector number and the medium identifier which are each 32 bits long, and outputs the lower-order 10 bits of the 32-bit XOR outcome to the searching unit 217 as the table reference data.

Figure 4:
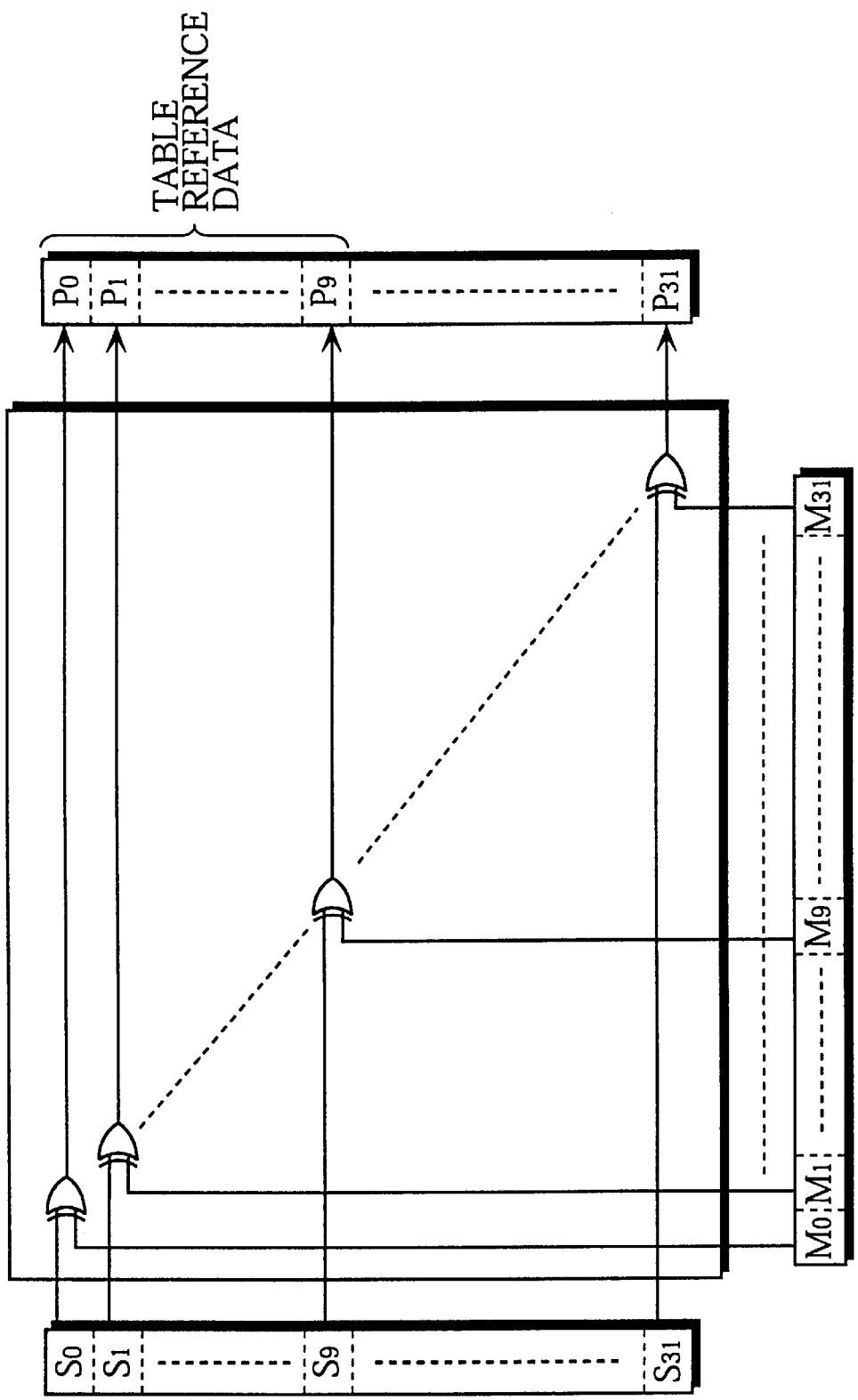
FIG. 4 shows the main construction of a reference data generating unit shown in FIG. 3.

FIG. 4 shows the main construction of the reference data generating unit 215 for XORing the sector number and the medium identifier. The 32 bits (S0 to S31) of the sector number and the 32 bits (M0 to M31) of the medium identifier are inputted in corresponding 32 XOR circuits in the reference data generating unit 215, as a result of which the 32-bit XOR outcome (P0 to P31) is obtained. The lower-order 10 bits (P0 to P9) of the obtained 32-bit data are outputted to the searching unit 217 as the table reference data.

Figure 5:
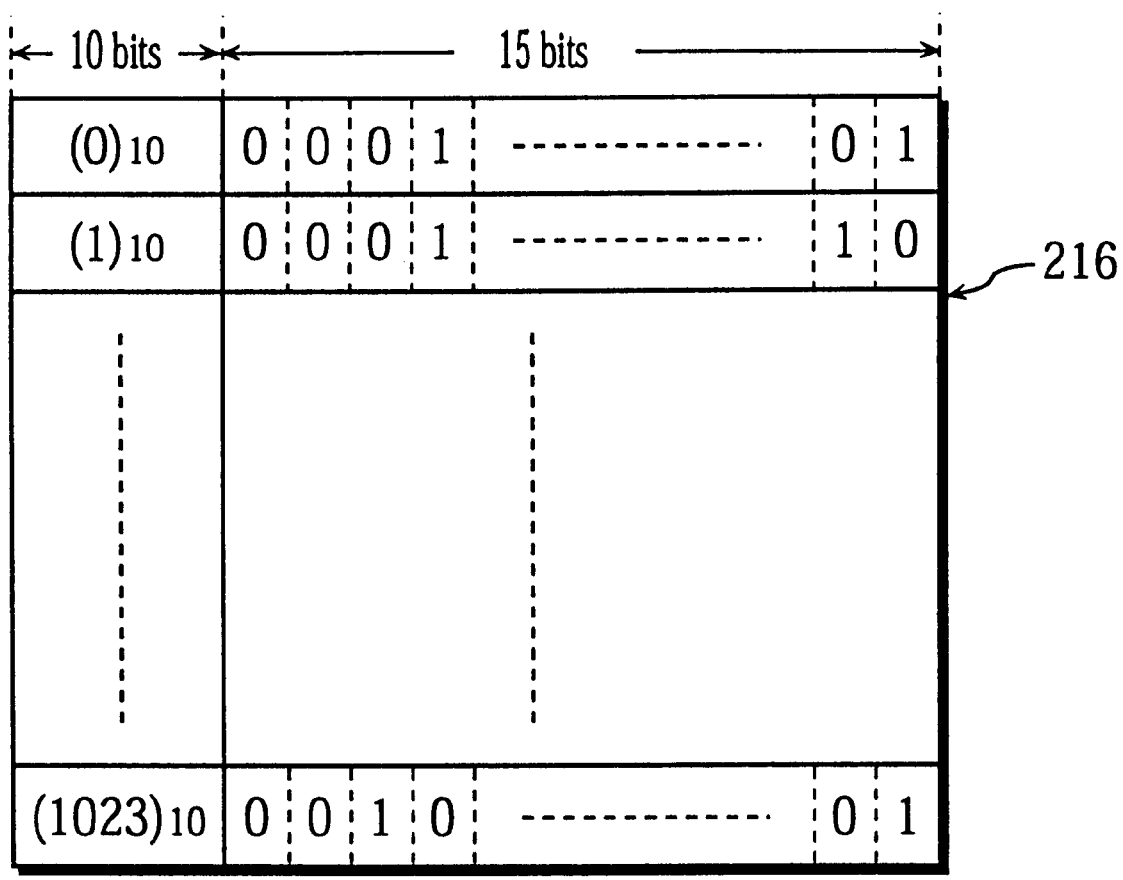
FIG. 5 shows the structure of an initial value table shown in FIG. 3.

FIG. 5 shows the structure of the initial value table 216. In this table, 1024 different 15-bit candidate random number initial values are each associated with a different one out of all possible values (0 to 1023) of table reference data.

The searching unit 217 searches the initial value table 216 for a candidate random number initial value corresponding to the table reference data outputted from the reference data generating unit 215, and outputs the candidate random number initial value to the random number generating unit 212 as the random number initial value.

Since the plurality of sectors 100 each have a different sector number, the random number initial value such determined by the medium identifier and the sector number of the sector into which the user data is to be stored will end up being unique to that sector.

The random number generating unit 212 generates a different random number for each byte of the user data based on the random number initial value, and outputs the random number to the scrambling unit 213.

Figure 6:
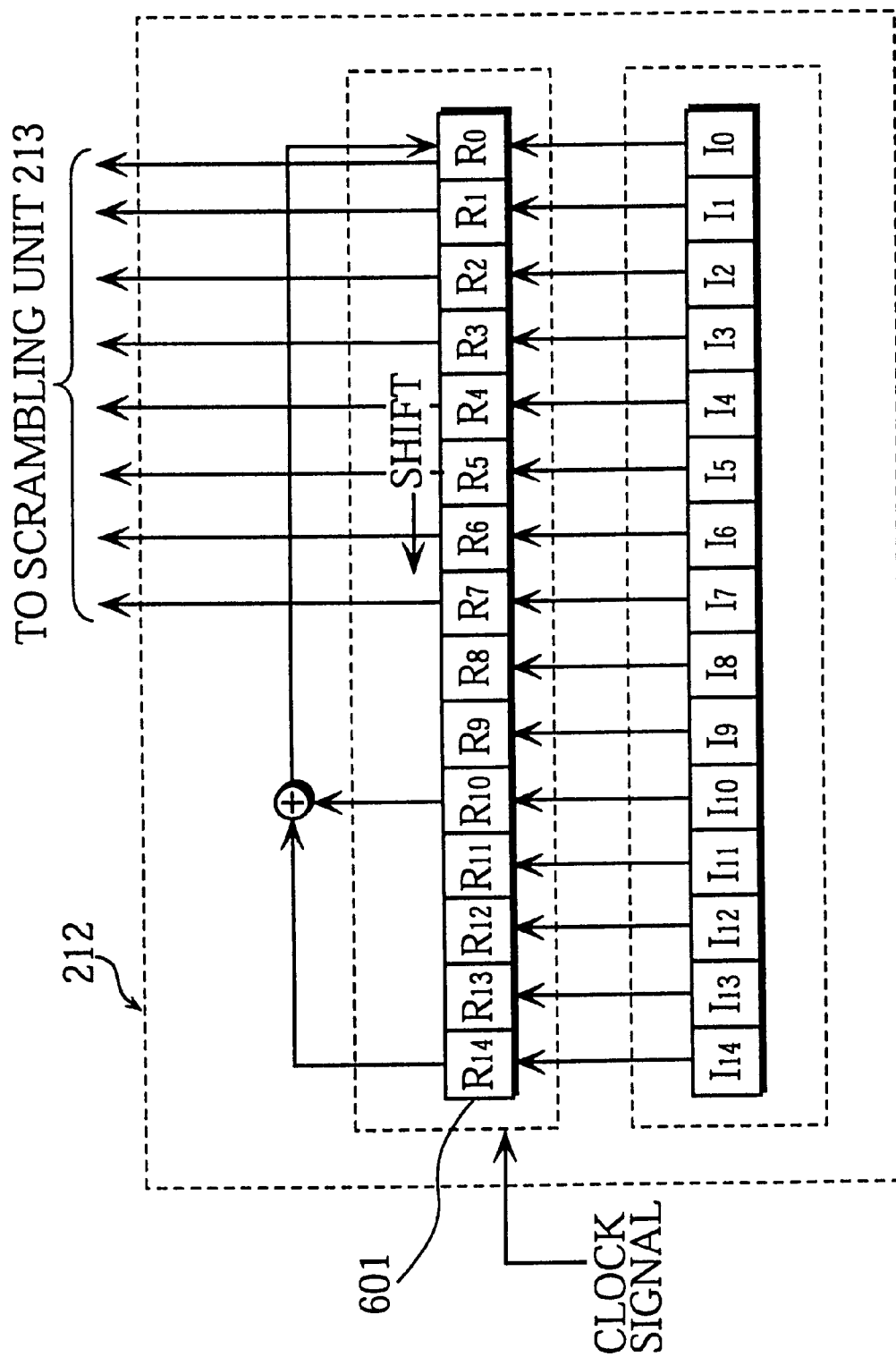
FIG. 6 shows the main construction of a random number generating unit shown in FIG. 3.

FIG. 6 shows the main construction of the random number generating unit 212 for generating a random number. First, the random number initial value of 15 bits (I0 to I14), which is outputted from the initial value determining unit 211 every time the sector number externally inputted in the initial value determining unit 211 changes, is inputted in an area 601 at respective bit positions (R0 to R14). When a clock signal from a clock generator (not illustrated) is inputted in the random number generating unit 212, the two bits in the bit positions R14 and R10 are XORed, the 15-bit data in the area 601 is shifted left by 1 bit, and the XOR outcome of the two bits is introduced in the rightmost bit position R0. Then the lower-order 8 bits in the bit positions R0 to R7 are outputted to the scrambling unit 213 as a random number. Here, the input of the clock signal in the random number generating unit 212 is made in sync with the input of 1 byte of the user data in the scrambling unit 213.

When 1 byte (8 bits) of the user data is inputted, the scrambling unit 213 scrambles the inputted 8-bit data with the 8-bit random number outputted from the random number generating unit 212. The scrambled data is then outputted to the writing unit 214. The scrambling here is carried out by XORing the inputted data and the random number for corresponding bits.

Figure 7:
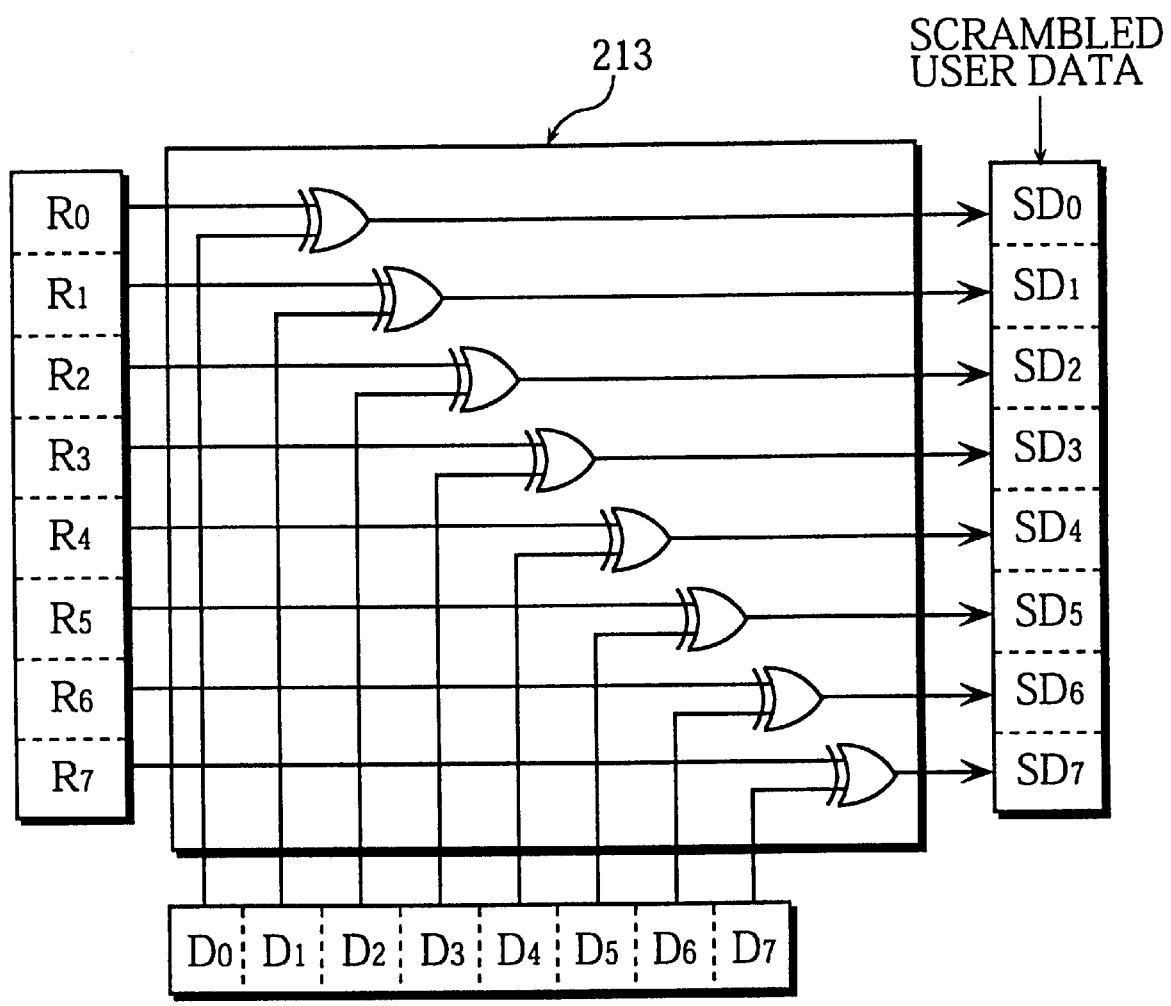
FIG. 7 shows the main construction of a scrambling unit shown in FIG. 3.

FIG. 7 shows the main construction of the scrambling unit 213 for scrambling the inputted data and the random number. The 8 bits (R0 to R7) of the random number and the 8 bits (D0 to D7) of the inputted data are inputted in corresponding 8 XOR circuits in the scrambling unit 213, as a result of which the 8-bit XOR outcome (SD0 to SD7) is obtained.

The above operations of the random number generating unit 212 and scrambling unit 213 are repeated on a byte-by-byte basis until all bytes of the user data are scrambled.

The writing unit 214 writes the scrambled user data into the data storage area of the appropriate sector in the information recording medium 10.

(Medium Identifier Recording Unit)

The medium identifier recording unit scrambles the medium identifier used for generating the scramble key of the user data, and stores the scrambled medium identifier into the medium identifier storage sector. This scrambling and writing of the medium identifier by the medium identifier recording unit precedes the aforementioned operation of the data recording unit 21. The medium identifier recording unit generates a scramble key for the medium identifier based on the sector number of the medium identifier storage sector and fixed data common to all information recording mediums, scrambles the medium identifier with the generated scramble key, and writes the scrambled medium identifier into the medium identifier storage sector.

Figure 8:
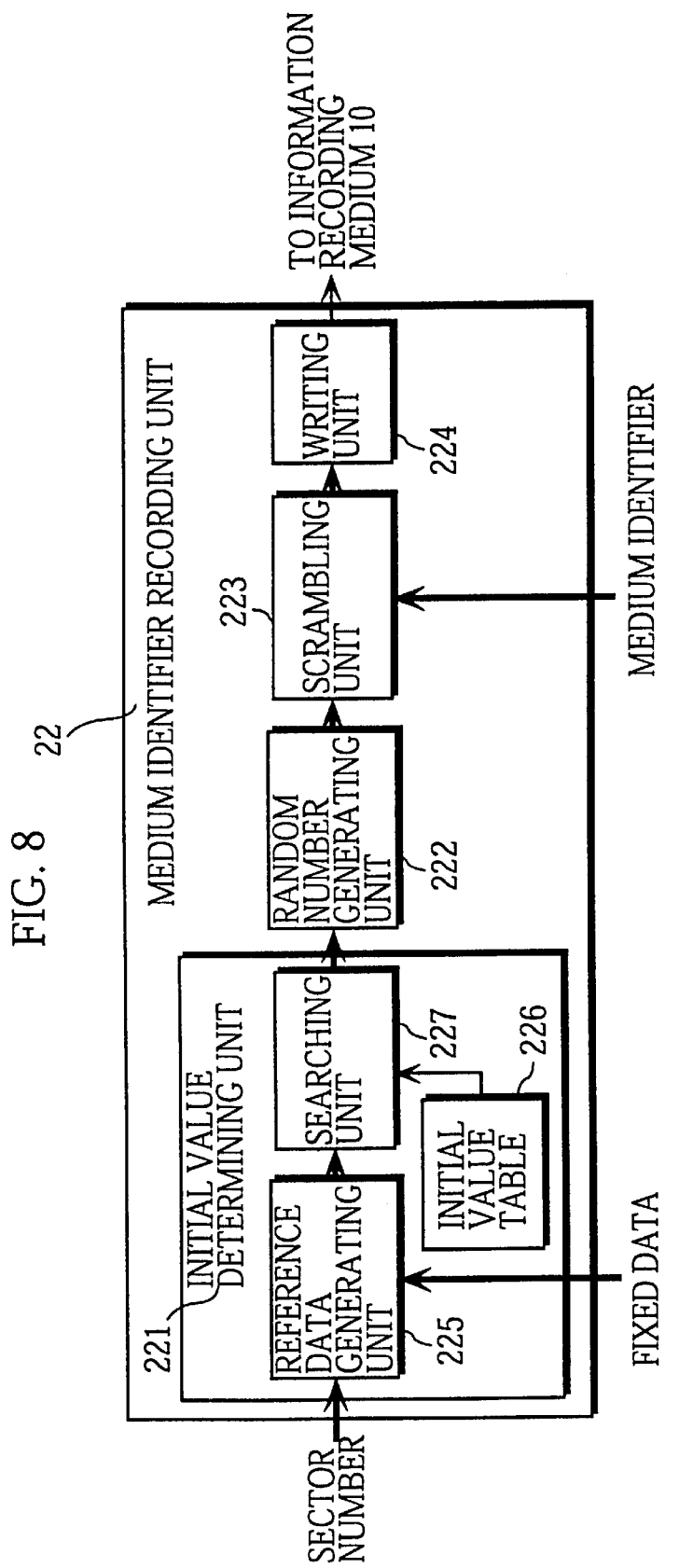
FIG. 8 is a block diagram showing the construction of a medium identifier recording unit in the information recording/reproducing apparatus.

FIG. 8 is a block diagram showing the construction of this medium identifier recording unit 22. The construction and operation of the medium identifier recording unit 22 are similar to the data recording unit 21, except that the processing object is the medium identifier. In the figure, an initial value determining unit 221 determines a random number initial value for a sequence of random numbers used for scrambling the medium identifier, based on the sector number of the medium identifier storage sector and the common fixed data. A random number generating unit 222 generates the sequence of random numbers from the random number initial value as the scramble key. A scrambling unit 223 scrambles the medium identifier using the sequence of random numbers, on a byte-by-byte basis. A writing unit 224 writes the scrambled medium identifier into the medium identifier storage sector of the information recording medium 10. The fixed data is 32 bits long in this embodiment.

The initial value determining unit 221 includes a reference data generating unit 225 for generating table reference data from the externally inputted sector number and fixed data, an initial value table 226 holding a plurality of candidate random number initial values which are each associated with different table reference data, and a searching unit 227 for searching the initial value table 226 for a candidate random number initial value associated with the table reference data generated by the reference data generating unit 225. The operations of the reference data generating unit 225 and searching unit 227 and the structure of the initial value table 226 are the same as the reference data generating unit 215, the searching unit 217, and the initial value table 216 in the data recording unit 21, so that their explanation has been omitted here.

Also, the operation of the random number generating unit 222 is the same as the random number generating unit 212 in the data recording unit 21.

The operations of the scrambling unit 223 and writing unit 224 are the same as the scrambling unit 213 and the writing unit 214 in the data recording unit 21. Since the medium identifier to be scrambled is 32 bits (4 bytes) long, the generation of a random number and the scrambling of 1 byte of the medium identifier are repeated four times, as a result of which the scrambled medium identifier is produced and written in the top 4-byte area of the data storage area of the medium identifier storage sector in the information recording medium 10.

(Medium Identifier Reproducing Unit)

The medium identifier reproducing unit descrambles the scrambled medium identifier stored in the medium identifier storage sector, and outputs the descrambled medium identifier to the data recording unit 21 or the data reproducing unit. When the recording of the user data onto the information recording medium 10 is required, the descrambled medium identifier is sent to the data recording unit 21, whereas when the reading and reproduction of the user data from the information recording medium 10 is required, the descrambled medium identifier is sent to the data reproducing unit.

The operation of the medium identifier reproducing unit is the inverse of the operation of the medium identifier recording unit 22. More specifically, while the medium identifier recording unit 22 scrambles the medium identifier (A) with the sequence of random numbers (scramble key) (B) to obtain the scrambled medium identifier (C) (i.e. A+B→C), the medium identifier reproducing unit descrambles the scrambled medium identifier (C) with the sequence of random numbers (descramble key) (B) to recover the original medium identifier (A) (i.e. C+B→A). Here, the descramble key must be identical to the scramble key, to recover the original medium identifier properly.

Figure 9:
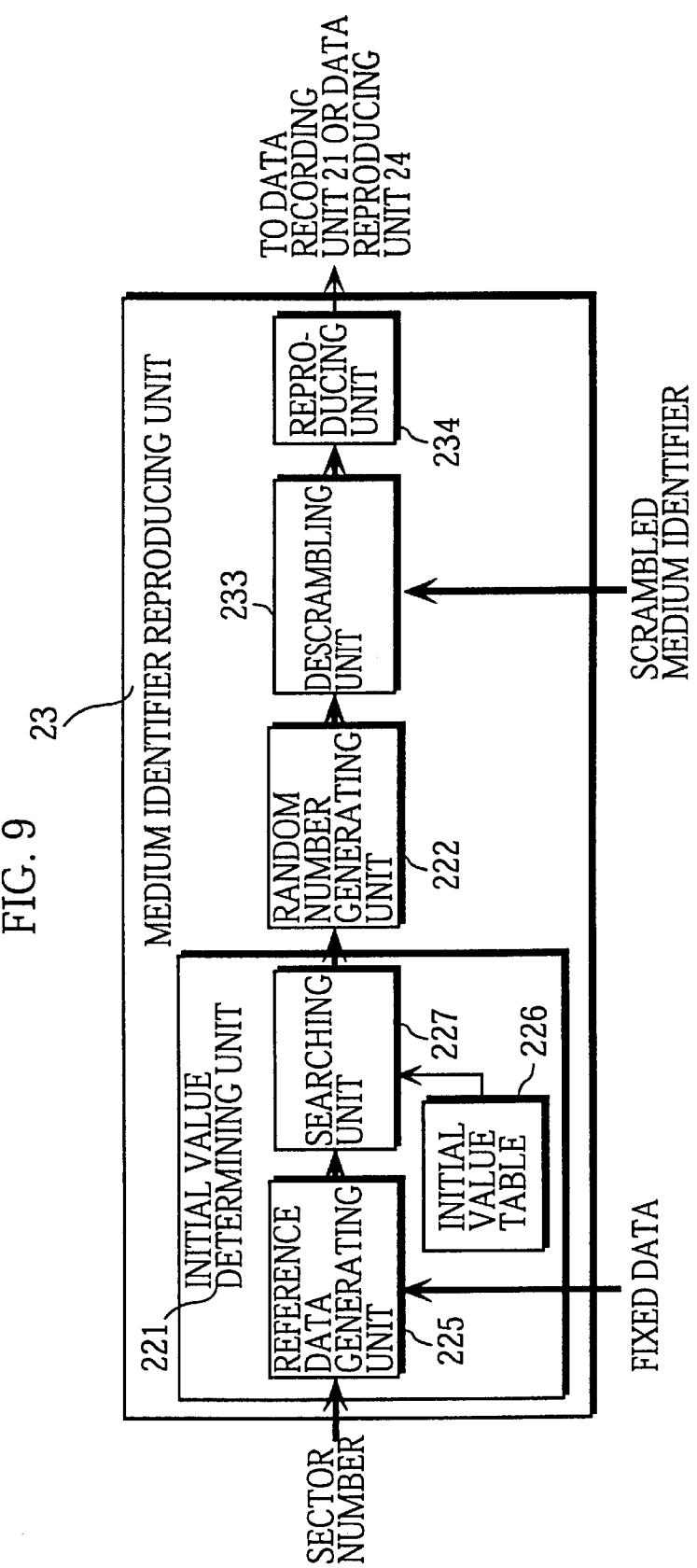
FIG. 9 is a block diagram showing the construction of a medium identifier reproducing unit in the information recording/reproducing apparatus.

FIG. 9 is a block diagram showing the construction of this medium identifier reproducing unit 23. Its operation is similar to the medium identifier recording unit 22. In particular, the construction and operation for generating a sequence of random numbers (descramble key) from the sector number of the medium identifier storage sector and the common fixed data are the same as the medium identifier recording unit 22. The medium identifier reproducing unit 23 is roughly made up of the initial value determining unit 221 for determining a random number initial value for a sequence of random numbers used for descrambling the scrambled medium identifier, the random number generating unit 222 for generating the sequence of random numbers from the random number initial value as the descramble key, a descrambling unit 233 for descrambling the scrambled medium identifier using the sequence of random numbers on a byte-by-byte basis, and a reproducing unit 234 for outputting the descrambled medium identifier to the data recording unit 21 or the data reproducing unit.

The operations of the initial value determining unit 221 and random number generating unit 222 are as explained above.

When 1 byte of the scrambled medium identifier is inputted, the descrambling unit 233 descrambles the inputted data using the same random number used for scrambling that byte of the medium identifier by the medium identifier recording unit 22. This descrambling is done by XORing the inputted data and the random number. To do this, the descrambling unit 233 has the same construction as the scrambling unit 223 in the medium identifier recording unit 22 (i.e. the scrambling unit 213 in the data recording unit 21 shown in FIG. 7). The descrambling is repeated four times, as a result of which the original medium identifier is recovered.

The reproducing unit 234 outputs the recovered medium identifier to the data recording unit 21 or the data reproducing unit.

(Data Reproducing Unit)

The data reproducing unit generates a descramble key based on the medium identifier outputted from the medium identifier reproducing unit 23 and the sector number of the sector in which the scrambled user data to be reproduced is stored, descrambles the scrambled user data using the generated descramble key, and outputs the descrambled user data to the PC 30.

The operation of this data reproducing unit is the inverse of the operation of the data recording unit 21. To be more specific, while the data recording unit 21 scrambles the user data (A) with the sequence of random numbers (scramble key) (B) to generate the scrambled user data (C) (i.e. A+B→C), the data reproducing unit descrambles the scrambled user data (C) with the sequence of random numbers (descramble key) (B) to obtain the original user data (A) (i.e. C+B→A). Here, the descramble key must be identical to the scramble key to obtain the original user data properly.

Figure 10:
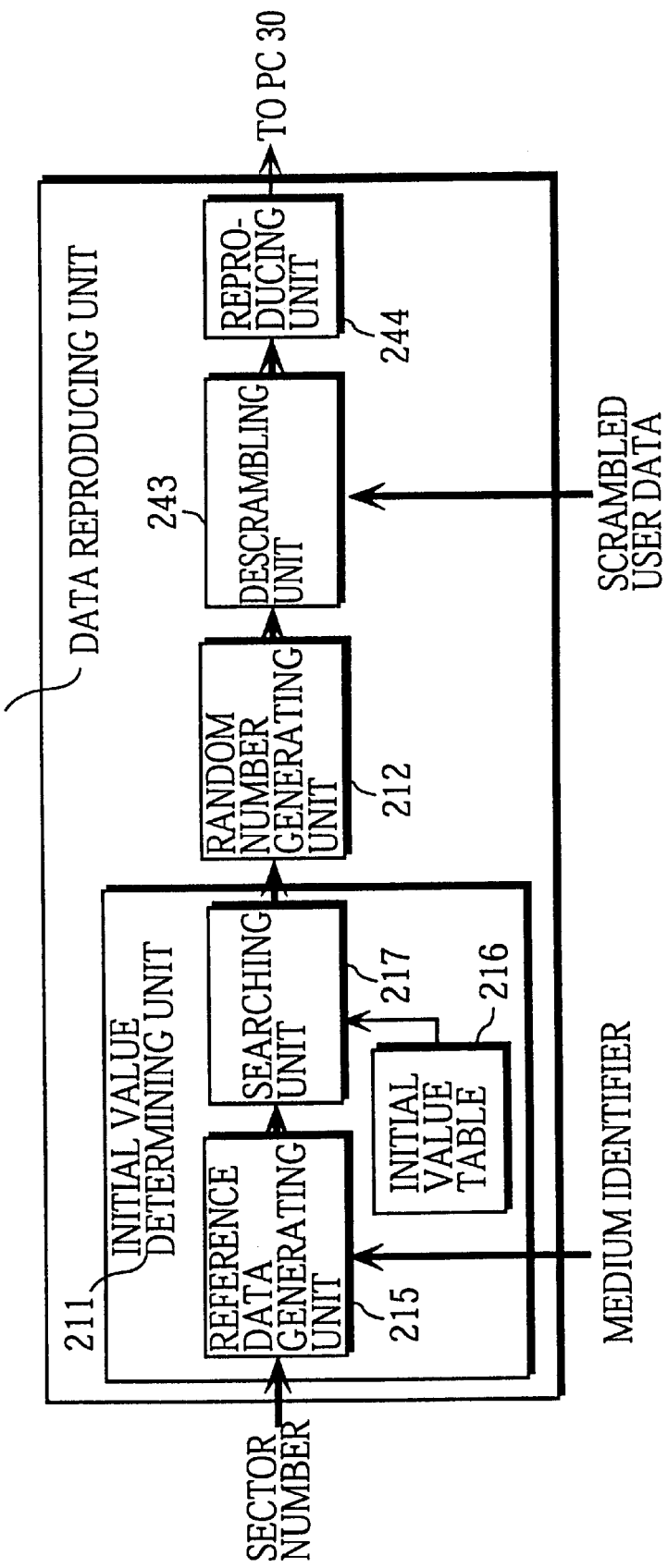
FIG. 10 is a block diagram showing the construction of a data reproducing unit in the information recording/reproducing apparatus.

FIG. 10 is a block diagram showing the construction of this data reproducing unit 24. Its operation is similar to the data recording unit 21. In particular, the construction and operation for generating a sequence of random numbers from the sector number and the medium identifier are the same as the data recording unit 21. The data reproducing unit 24 is roughly made up of the initial value determining unit 211 for determining a random number initial value for a sequence of random numbers (descramble key) used for descrambling the scrambled user data, the random number generating unit 212 for generating the sequence of random numbers from the random number initial value as the descramble key, a descrambling unit 243 for descrambling the scrambled user data using the sequence of random numbers on a byte-by-byte basis, and a reproducing unit 244 for outputting the descrambled user data to the PC 30.

The operations of the initial value determining unit 211 and random number generating unit 212 are as explained above.

The operation of the descrambling unit 243 is similar to the scrambling unit 213 in the data recording unit 21. When 1 byte of the scrambled user data is inputted, the descrambling unit 243 takes XOR of the inputted data and the same random number used for scrambling that byte of the user data by the data recording unit 21, and outputs the descrambled data to the reproducing unit 244. This descrambling is repeated until all bytes of the scrambled user data are descrambled, as a result of which the original user data is obtained.

The reproducing unit 244 temporarily holds the user data outputted from the descrambling unit 243, and outputs it to the PC 30 at a predetermined transfer rate.

(Conclusion)

According to this embodiment, user data to be recorded on the information recording medium 10 is scrambled using a scramble key which is generated from the unique medium identifier of the information recording medium 10 and the unique sector number of the sector into which the user data is to be recorded. Therefore, even if an unauthorized party acquires a scramble key used for recording user data on one information recording medium, it cannot reproduce user data recorded on another information recording medium using the acquired scramble key. Also, even if the unauthorized party acquires a scramble key used for recording user data in one sector of an information recording medium, it cannot reproduce user data recorded in another sector of the information recording medium using the acquired scramble key. By ensuring security not only for each individual medium but also for each individual sector in this manner, unauthorized data reproduction is effectively prevented.

Furthermore, the medium identifier itself is scrambled using a scramble key which is generated from the fixed data and the sector number of the medium identifier storage sector, and is stored on the information recording medium 10. This makes it difficult for the unauthorized party to acquire the medium identifier, thereby preventing unauthorized data reproduction more effectively.

It should be noted that the scrambling of the medium identifier may be performed at the time of manufacturing of the information recording medium 10. In such a case, the medium identifier recording unit 22 described above is not part of the information recording/reproducing apparatus 20 but is an independent device.

Also, the content of the initial value table for determining a random number initial value may be made different for each information recording/reproducing apparatus. In such a case, user data recorded on an information recording medium by one information recording/reproducing apparatus cannot be reproduced by another information recording/ reproducing apparatus. This ensures security for each information recording/reproducing apparatus.

Second Embodiment

The following is a description of the second embodiment of the invention. The differences with the first embodiment primarily lie in the construction and operation for determining it a random number initial value in the data recording unit and the data reproducing unit. The following description focuses on the differences with the first embodiment.

(Data Recording Unit)

Figure 11:
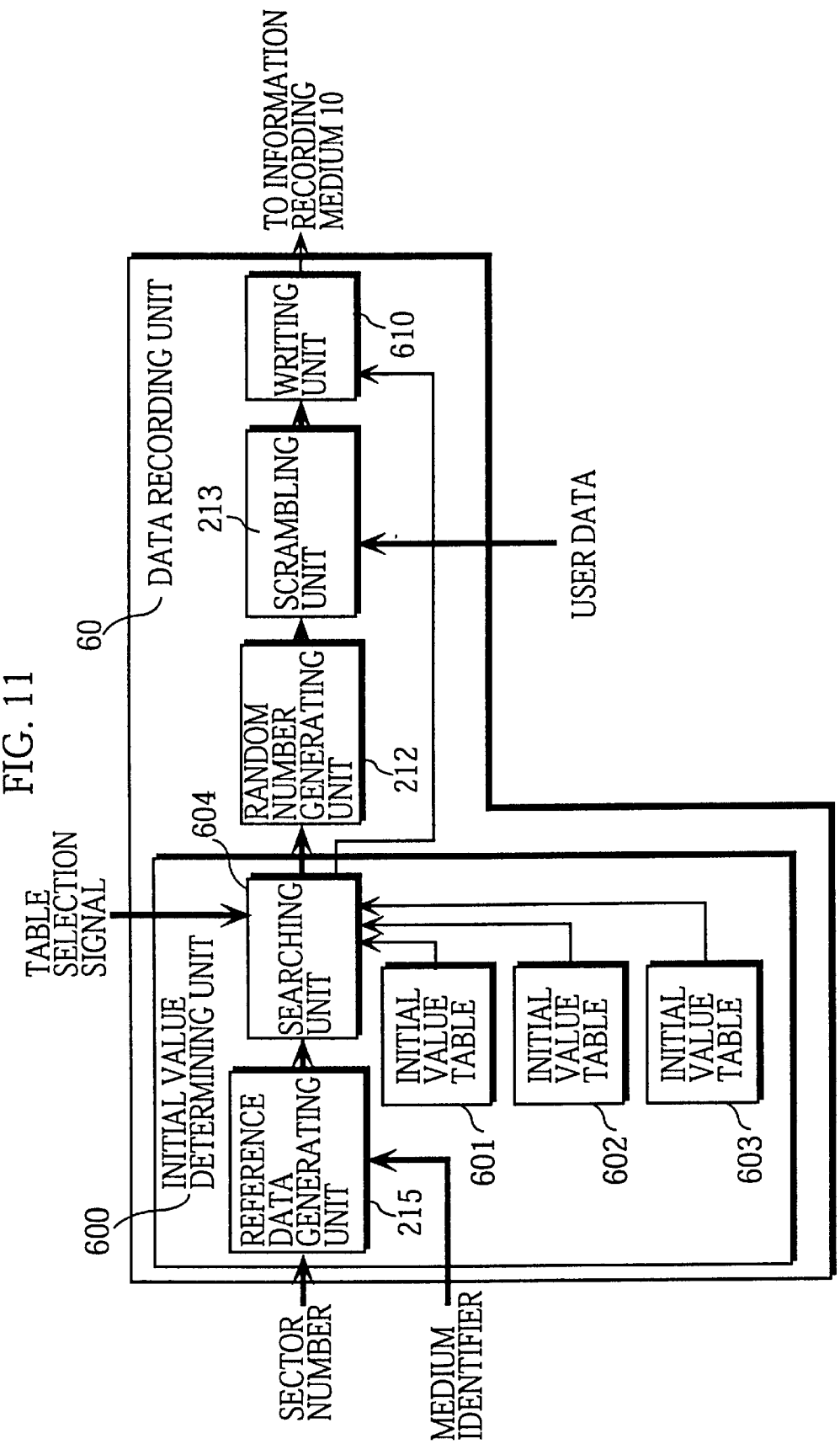
FIG. 11 is a block diagram showing the construction of a data recording unit according to the second embodiment of the invention.

FIG. 11 is a block diagram showing the construction of a data recording unit 60 according to the second embodiment. This data recording unit 60 differs with the data recording unit 21 shown in FIG. 3 in that it is equipped with an initial value determining unit 600 and a writing unit 610 in place of the initial value determining unit 211 and the writing unit 214. The initial value determining unit 600 includes the reference data generating unit 215, three initial value tables 601 to 603, and a searching unit 604. Among these, the reference data generating unit 215 is the same as that in the data recording unit 21. The searching unit 604 selects one of the initial value tables 601 to 603 to be searched using table reference data generated by the reference data generating unit 215, in accordance with an externally inputted table selection signal. In the description that follows, user data is grouped under three types that are image data, audio data, and character data.

The initial value tables 601 to 603 are provided for image data, audio data, and character data, respectively. The structure of each initial value table is the same as the initial value table 216 in the data recording unit 21. Candidate random number initial values are different with each other not only within each of the initial value tables 601 to 603 but also across the initial value tables 601 to 603.

Once the reference data generating unit 215 has generated the table reference data from the sector number and the medium identifier and outputted the table reference data to the searching unit 604 as in the first embodiment, the searching unit 604 selects one of the initial value tables 601 to 603 in accordance with the table selection signal inputted along with the sector number and the medium identifier, searches the selected initial value table for a candidate random number initial value corresponding to the table reference data, and outputs the candidate random number initial value to the random number generating unit 212.

The table selection signal takes on three values which correspond to the three types of user data that are image data, audio data, and character data. Information specifying the type of the user data is contained in header information of the user data.

Here, the value of the table selection signal' needs to be retained so as to enable the data reproducing unit to select the same initial value table as the data recording unit 60. Accordingly, the searching unit 604 outputs the table selection signal value to the writing unit 610. The writing unit 610 writes the table selection signal value into the sector header area of the sector into which the user data is to be stored.

The operations of the random number generating unit 212 and scrambling unit 213, and the operation of writing the scrambled user data by the writing unit 601 are the same as those in the first embodiment.

(Data Reproducing Unit)

Figure 12:
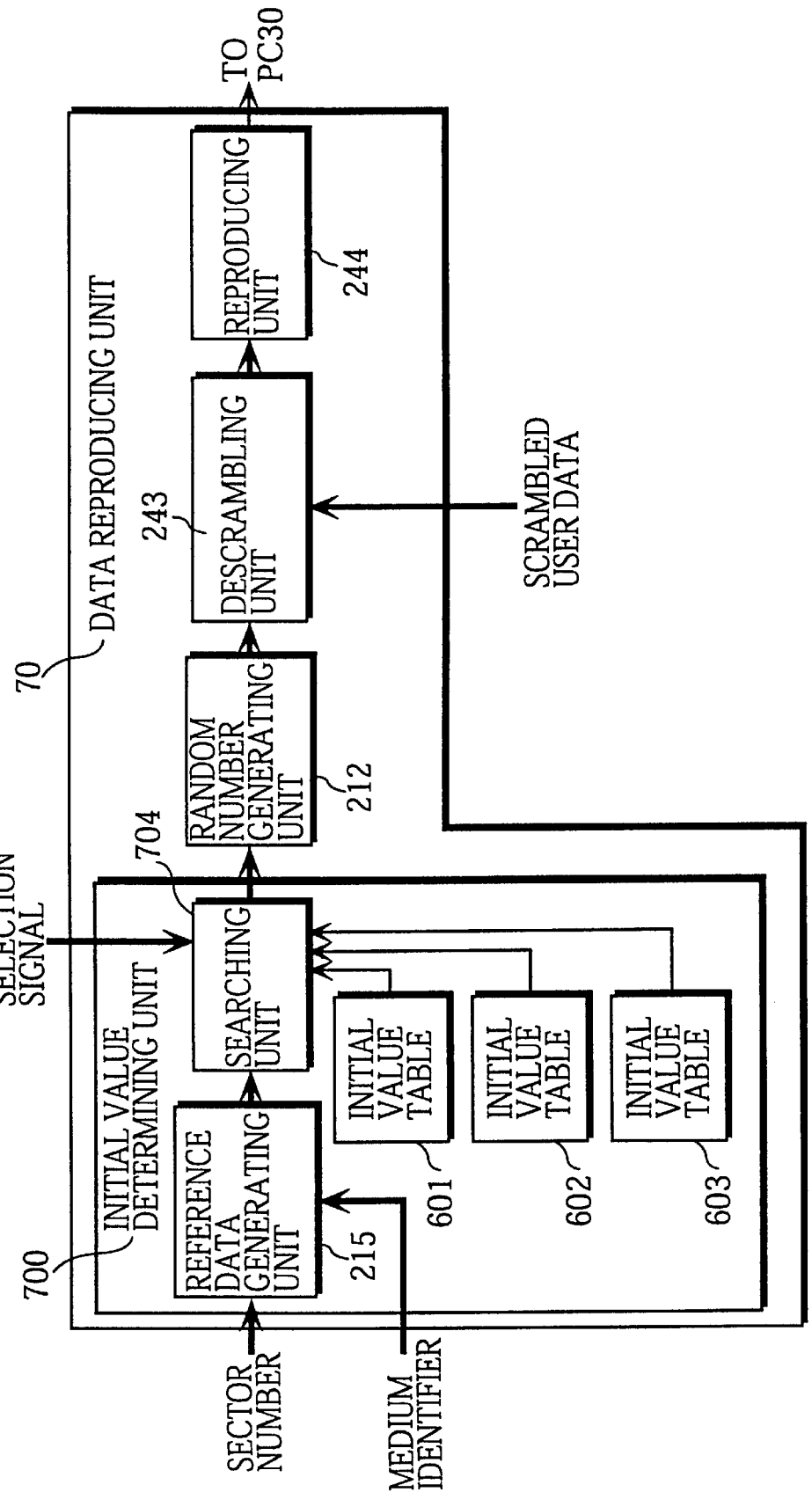
FIG. 12 is a block diagram showing the construction of a data reproducing unit according to the second embodiment.

FIG. 12 is a block diagram showing the construction of a data reproducing unit 70 according to the second embodiment. This data reproducing unit 70 differs with the data reproducing unit 24 shown in FIG. 10 in that it is equipped with an initial value determining unit 700 in place of the initial value determining unit 211. The initial value determining unit 700 includes the reference data generating unit 215, the three initial value tables 601 to 603, and a searching unit 704. Among these, the reference data generating unit 215 is the same as that in the data reproducing unit 24.

The initial value tables 601 to 603 are the same as those in the data recording unit 60.

The searching unit 704 selects one of the initial table values 601 to 603 to be searched using table reference data generated by the reference data generating unit 215, in accordance with the externally inputted table selection signal.

Once the reference data generating unit 215 has generated the table reference data from the sector number and the medium identifier and outputted it to the searching unit 704, the searching unit 704 selects one of the initial value tables 601 to 603 based on the table selection signal value read from the sector header area of the sector which stores the scrambled user data, searches the selected initial value table for a candidate random number initial value corresponding to the table reference data, and outputs the candidate random number initial value to the random number generating unit 212.

As noted earlier, this table selection signal value was referenced in the scrambling of the user data and stored in the corresponding sector together with the scrambled user data, by the data recording unit 60.

The operations of the random number generating unit 212, descrambling unit 243, and reproducing unit 244 are the same as those in the first embodiment.

(Conclusion)

According to this embodiment, a scramble key (a sequence of random numbers) for scrambling user data is generated based on the three factors that are a sector number, a medium identifier, and a table selection signal (user data type). Accordingly, a danger that an unauthorized party acquires the scramble key and reproduces the user data with the scramble key is further reduced.

Though the initial value tables are provided for the different data types in this embodiment, initial value tables may also be provided for different application and/or version types.

Also, the information recording/reproducing apparatus 20 may be provided only with initial value tables corresponding to certain data, application, and/or version types, so as to restrict the processing of the information recording/reproducing apparatus 20 to those types of data.

Figure 13:
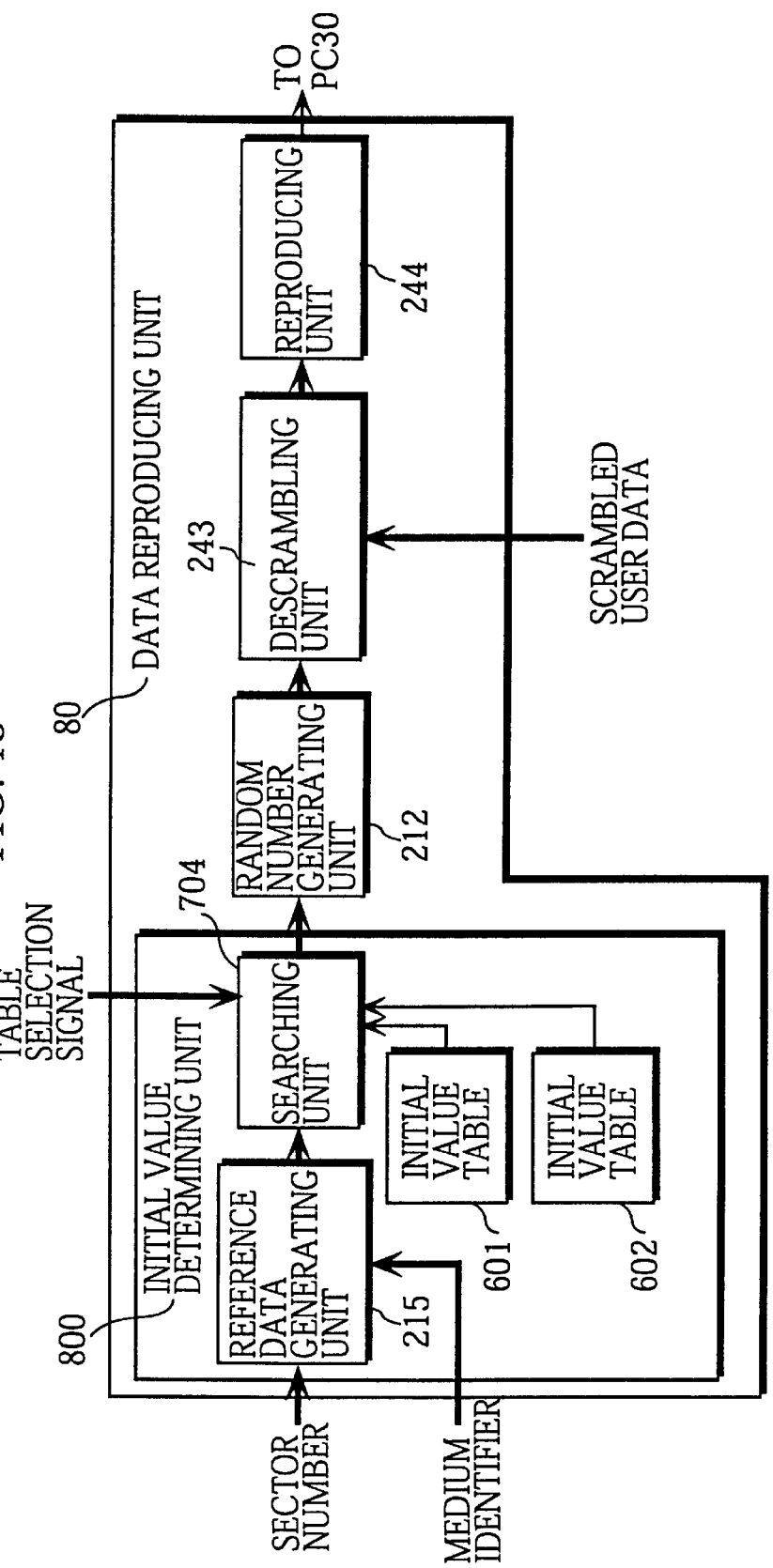
FIG. 13 is a block diagram showing the construction of a data reproducing unit as a variant of the data reproducing unit shown in FIG. 12.

FIG. 13 is a block diagram showing the construction of a data reproducing unit 80 in an information recording/reproducing apparatus 20 that can handle only image data and audio data. As illustrated, this data reproducing unit 80 has the image data initial value table 601 and the audio data initial value table 602 but not the character data initial value table 603. This being so, even if another information recording/reproducing apparatus scrambles character data and records the scrambled character data on the information recording medium 10, the information recording/reproducing apparatus 20 cannot reproduce the character data, as it cannot obtain a descramble key to descramble the scrambled character data without the character data initial value table 603. By limiting the initial value tables in each information recording/reproducing apparatus so that it can process only certain data, application, and/or version types, it is possible to prohibit information recording/reproducing apparatuses that differ in processable data, application, and/or version types, from using the same information recording medium.

In the first and second embodiments, the medium identifier is stored in only one of the plurality of sectors 100 of the information recording medium 10. However, if part of the medium identifier storage sector storing the medium identifier gets damaged, reproduction of user data may become impossible. To avoid such a danger, the medium identifier may be stored in more than one sector.

Also, information such as the fixed data, the unscrambled medium identifier, and the sector number of the medium identifier storage sector may be retained in the lead-in area 110 of the information recording medium 10 by a stamper.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An information recording medium comprising:
   a first sector which has a unique sector number and stores a medium identifier which is unique to said information recording medium; and
   a plurality of second sectors each of which has a unique sector number and stores user data;
   wherein the user data stored in each of said plurality of second sectors has been scrambled using a data scramble key generated based on the medium identifier and the unique sector number of the second sector.

2. The information recording medium of claim 1, wherein:
   the data scramble key is a sequence of random numbers generated from an initial value, the initial value obtained by:
      generating reference data from the medium identifier and the unique sector number of the second sector;
      searching an initial value table which holds a plurality of candidate initial values, each of which is associated with different reference data, for a candidate initial value associated with the generated reference data; and
      setting the candidate initial value as the initial value; and
   the user data has been scrambled by performing a predetermined operation on the user data and the sequence of random numbers on a byte-by-byte basis.

3. The information recording medium of claim 2, wherein the medium identifier stored in said first sector has been scrambled using a medium identifier scramble key generated based on predetermined data and the unique sector number of the first sector.

4. The information recording medium of claim 3, wherein said first sector also stores user data.

5. The information recording medium of claim 4, wherein the predetermined data is stored in a lead-in area of said information recording medium.

6. The information recording medium of claim 1, wherein the medium identifier is recorded to said information recording medium at the time of manufacturing said information recording medium.

7. The information recording medium of claim 2, wherein the predetermined operation performed on the user data and the sequence of random numbers on a byte-by-byte basis is an XOR operation.

8. An information recording apparatus for scrambling user data and recording the scrambled user data onto an information recording medium, the information recording medium including a first sector which stores a medium identifier which is unique to the information recording medium and a plurality of second sectors each of which has a unique sector number and is used for storing user data, said information recording apparatus comprising:
   an initial value determining device operable to determine an initial value based on the medium identifier and a unique sector number of a second sector into which the user data is to be recorded;
   a random number generating device operable to generate a sequence of random numbers from the initial value;
   a scrambling device operable to scramble the user data using the sequence of random numbers; and
   a recording device operable to record the scrambled user data into the second sector.

9. The information recording apparatus of claim 8, wherein
   the first sector has a unique sector number, and the medium identifier stored in the first sector has been scrambled using a scramble key generated based on predetermined data and the sector number of the first sector;
   said information recording apparatus further comprises:
      a medium identifier reproducing device operable to read the scrambled medium identifier from the first sector, and descramble the scrambled medium identifier using a descramble key generated based on the predetermined data and the sector number of the first sector; and
      said initial value determining device is operable to determine the initial value based on the descrambled medium identifier and the unique sector number of the second sector.

10. The information recording apparatus of claim 9, wherein said initial value determining device comprises:
    a reference data generating device operable to generate reference data from the medium identifier and the unique sector number of the second sector;
    an initial value table holding a plurality of candidate initial values each of which is associated with different reference data; and
    a searching device operable to search said initial value table for a candidate initial value associated with the reference data generated by said reference data generating device, and set the candidate initial value as the initial value;
    wherein said random number generating device is operable to generate the sequence of random numbers from the initial value set by said searching device.

11. The information recording apparatus of claim 10, wherein:
    the user data is accompanied by type information showing a data type of the user data;
    said initial value determining device further comprises:
       a plurality of different initial value tables corresponding to different data types; and
       a table selecting device operable to select one of the plurality of initial value tables in accordance with the type information accompanying the user data; and
       said searching device is operable to search the selected initial value table for the candidate initial value associated with the generated reference data.

12. An information recording method for scrambling user data and recording the scrambled user data onto an information recording medium, the information recording medium including a first sector which stores a medium identifier which is unique to the information recording medium and a plurality of second sectors each of which has a unique sector number and is used for storing user data, said information recording method comprising:
    determining an initial value based on the medium identifier and a unique sector number of a second sector into which the user data is to be recorded;
    generating a sequence of random numbers from the initial value;
    scrambling the user data using the sequence of random numbers; and
    recording the scrambled user data into the second sector.

13. The information recording method of claim 12, wherein
   the first sector has a unique sector number, and the medium identifier stored in the first sector has been scrambled using a scramble key generated based on predetermined data and the sector number of the first sector;
   said information recording method further comprising:
      reading the scrambled medium identifier from the first sector, and descrambling the scrambled medium identifier using a descramble key generated based on the predetermined data and the sector number of the first sector; and
      said determining determines the initial value based on the descrambled medium identifier and the unique sector number of the second sector.

14. The information recording method of claim 13, wherein said determining the initial value includes:
   generating reference data from the medium identifier and the unique sector number of the second sector; and
   searching an initial value table that holds a plurality of candidate initial values, which are each associated with different reference data, for a candidate initial value associated with the reference data generated by said generating reference data, and setting the candidate initial value as the initial value; and
   wherein said generating the sequence of random numbers generates the sequence of random numbers from the initial value set by said searching.

15. The information recording method of claim 14, wherein:
   the user data is accompanied by type information showing a data type of the user data;
   said determining the initial value further comprises:
      selecting, among a plurality of different initial value tables corresponding to different data types, an initial value table in accordance with the type information accompanying the user data; and
      said searching searches the selected initial value table for the candidate initial value associated with the generated reference data.

16. An information reproducing apparatus for reproducing user data recorded on an information recording medium, the information recording medium including a first sector which stores a medium identifier which is unique to the information recording medium and a plurality of second sectors each of which has a unique sector number and is used for storing user data in a scrambled form, said information reproducing apparatus comprising:
   an initial value determining device operable to determine an initial value based on the medium identifier and a unique sector number of a second sector in which the user data to be reproduced is stored in a scrambled form;
   a random number generating device operable to generate a sequence of random numbers from the initial value; and
   a reproducing device operable to read the scrambled user data from the second sector, descramble the scrambled user data using the sequence of random numbers, and reproduced the descrambled user data.

17. The information reproducing apparatus of claim 16, wherein:
   the first sector has a unique sector number, and the medium identifier stored in the first sector has been scrambled using a scramble key generated based on predetermined data and the sector number of the first sector;
   said information reproducing apparatus further comprising:
      a medium identifier reproducing device operable to read the scrambled medium identifier from the first sector, and descrambled the scrambled medium identifier using-a descramble key generated based on the predetermined data and the sector number of the first sector; and
      said initial value determining device is operable to determine the initial value based on the descrambled medium identifier and the unique sector number of the second sector.

18. An information reproducing method for reproducing user data recorded on an information recording medium, the information recording medium including a first sector which stores a medium identifier which is unique to the information recording medium and a plurality of second sectors each of which has a unique sector number and is used for storing user data in a scrambled form, said information reproducing method comprising:
   determining an initial value based on the medium identifier and a unique sector number of a second sector in which the user data to be reproduced is stored in a scrambled form;
   generating a sequence of random numbers from the initial value; and
   reading the scrambled user data from the second sector, descrambling the scrambled user data using the sequence of random numbers, and reproducing the descrambled user data.

19. The information reproducing method of claim 10, wherein:
   the first sector has a unique sector number, and the medium identifier stored in the first sector has been scrambled using a scramble key generated based on predetermined data and the sector number of the first sector;
   said information reproducing method further comprising:
      reading the scrambled medium identifier from the first sector, and descrambling the scrambled medium identifier using a descramble key generated based on the predetermined data and the sector number of the first sector; and
      said determining the initial value determines the initial value based on the descrambled medium identifier and the sector number of the second sector.

20. A medium identifier recording apparatus for recording a unique medium identifier onto an information recording medium that includes a first sector for storing the medium identifier, said medium identifier recording apparatus comprising:
   an initial value determining device operable to determine an initial value based on predetermined data and a sector number uniquely given to the first sector;
   a random number generating device operable to generate a sequence of random numbers from the initial value;
   a scrambling device operable to scramble the medium identifier using the sequence of random numbers; and
   a recording device operable to record the scrambled medium identifier into the first sector.

* * * * *

UNITED STATES PATENT AND TRADEMARK OFFICE
CERTIFICATE OF CORRECTION

PATENT NO.     : 6,526,010 B1
DATED          : February 25, 2003
INVENTOR(S)    : Koichi Morioka et al.

It is certified that error appears in the above-identified patent and that said Letters Patent is hereby corrected as shown below:

<u>Title page,</u>
Item [57], ABSTRACT,
Line 12, change "In so doing," to -- As a result, --.
Line 14, change "with it being possible to protect" to -- thereby protecting --.

Signed and Sealed this

Sixteenth Day of September, 2003

JAMES E. ROGAN
*Director of the United States Patent and Trademark Office*